United States Patent
Zhang et al.

(10) Patent No.: US 12,208,766 B2
(45) Date of Patent: Jan. 28, 2025

(54) SAFETY BELT RETRACTOR AND SAFETY BELT DEVICE

(71) Applicant: Yanfeng Automotive Safety Systems Co., Ltd., Shanghai (CN)

(72) Inventors: Lijun Zhang, Shanghai (CN); Kai Lu, Shanghai (CN)

(73) Assignee: Yanfeng Automotive Safety Systems Co., Ltd., Shanghai (CN)

( * ) Notice: Subject to any disclaimer, the term of this patent is extended or adjusted under 35 U.S.C. 154(b) by 401 days.

(21) Appl. No.: 17/623,092

(22) PCT Filed: Jul. 22, 2020

(86) PCT No.: PCT/CN2020/103372
§ 371 (c)(1),
(2) Date: Dec. 27, 2021

(87) PCT Pub. No.: WO2021/027507
PCT Pub. Date: Feb. 18, 2021

(65) Prior Publication Data
US 2022/0266791 A1    Aug. 25, 2022

(30) Foreign Application Priority Data
Aug. 12, 2019  (CN) .......................... 201910737453.5

(51) Int. Cl.
*B60R 22/34*     (2006.01)
*B60R 22/405*    (2006.01)
*B60R 22/28*     (2006.01)

(52) U.S. Cl.
CPC ...... *B60R 22/405* (2013.01); *B60R 2022/287* (2013.01)

(58) Field of Classification Search
CPC .................. B60R 22/405; B60R 22/34; B60R 2022/3402
See application file for complete search history.

(56) References Cited

U.S. PATENT DOCUMENTS 5,443,223  A  *  8/1995  Yosin ..................... B60R 22/34
                                                          264/249
6,113,022  A  *  9/2000  Ono ................... B60R 22/3413
                                                          242/379.1
(Continued)

FOREIGN PATENT DOCUMENTS

CN       102227341 A      10/2011
CN       102227342 A  *   10/2011  ......... B60R 22/3413
(Continued)

OTHER PUBLICATIONS

Extended European Search Report issued on Aug. 28, 2023 of the corresponding EP application 20853465.1 (6 pages).
(Continued)

*Primary Examiner* — Sang K Kim
(74) *Attorney, Agent, or Firm* — Merchant & Gould P.C.

(57) ABSTRACT

A safety belt retractor, comprising a frame (8) and a belt retracting cylinder (1), the retracting cylinder (1) being rotatably supported in the frame (8) and being composed to be used for winding a woven belt (2). The frame (8) comprises: a back plate (8h), which has a first side and a second side which are opposite to each other, and a first opening (20); a plurality of first supporting legs (8a,8b), extending from the first side of the back plate (8h); a first support plate (11), which is provided with a second opening (21) and is connected to free end regions of the first supporting legs (8a, 8b); a plurality of second supporting legs (8c, 8d, 8e, 8f), extending from the second side of the back plate (8h); and a second supporting plate (9), connected to the free end regions of the second supporting legs (8c, 8d, 8e, 8f). The first opening (20) and the second opening (21) receive the belt retracting cylinder (1). The safety belt retractor is simple in structure and easy to assembly. Also
(Continued)

provided is a safety belt device comprising the safety belt retractor.

18 Claims, 1 Drawing Sheet

(56) References Cited

U.S. PATENT DOCUMENTS

| | | | |
|---|---|---|---|
| 8,584,980 B2 | 11/2013 | Clute et al. | |
| 2011/0215184 A1 | 9/2011 | Clute et al. | |
| 2012/0139223 A1* | 6/2012 | Nakaoka | B60R 22/36 280/806 |
| 2012/0248847 A1* | 10/2012 | Shiotani | B60R 22/4628 297/479 |
| 2012/0292421 A1* | 11/2012 | Schrade | B60R 22/34 242/404.3 |
| 2022/0048465 A1 | 2/2022 | Zhang et al. | |
| 2022/0118940 A1 | 4/2022 | Zhang et al. | |

FOREIGN PATENT DOCUMENTS

| | | | | |
|---|---|---|---|---|
| CN | 102753402 A | | 10/2012 | |
| CN | 106458148 A | | 2/2017 | |
| CN | 109159755 A | | 1/2019 | |
| CN | 109177915 A | | 1/2019 | |
| CN | 109177916 A | | 1/2019 | |
| CN | 109398299 A | * | 3/2019 | ............. B60R 22/34 |
| CN | 110316144 A | | 10/2019 | |
| CN | 110667511 A | * | 1/2020 | ......... B60R 22/1958 |
| CN | 210454739 U | | 5/2020 | |
| DE | 19961108 A1 | * | 6/2001 | ............. B60R 22/46 |
| DE | 102013202547 A1 | | 4/2013 | |
| JP | 2012509808 A | | 4/2012 | |
| WO | WO-2015028014 A1 | * | 3/2015 | ......... B60R 22/3413 |
| WO | WO-2015185191 A1 | * | 12/2015 | ............. B21D 53/28 |

OTHER PUBLICATIONS

PCT International Search Report for PCT Application No. PCT/CN2020/103372 mailed Oct. 30, 2020 (6 pages, with English translation).

PCT Written Opinion for PCT Application No. PCT/CN2020/103372 mailed Oct. 30, 2020 (4 pages).

First Office Action dated Dec. 27, 2023 for Chinese Application No. 201910737453.5 (18 pages including English Translation).

* cited by examiner

SAFETY BELT RETRACTOR AND SAFETY BELT DEVICE

CROSS-REFERENCE TO RELATED APPLICATIONS

This application is a National Stage Application of PCT/CN2020/103372, filed 22 Jul. 2020, which claims priority to Ser. No. 20/191,0737453.5 filed in China on 12 Aug. 2019, and which applications are incorporated herein by reference. To the extent appropriate, a claim of priority is made to the above disclosed applications.

TECHNICAL FIELD

The disclosure relates to the technical field of vehicle safety, in particular a safety belt retractor and a safety belt device comprising the same.

BACKGROUND OF INVENTION

In a motor vehicle, a safety belt device is an important part of an occupant restraint system, and can provide protection for an occupant to avoid or minimize an injury to him, especially in case of a traffic accident. With the development and progress of the motor vehicle technology, requirements on the performance of safety belt devices are increasing.

A safety belt device comprises a safety belt retractor that may be provided with a sensing unit and a locking mechanism, which are known in various forms in the prior art. The sensing unit can, for example, sense a safety-relevant state such as an acceleration and/or a tilt angle of a motor vehicle, and activate the locking mechanism to lock a belt reel in a webbing pull-out direction in predetermined situations. Relevant prior art may be referred to, for example, the prior patent applications CN109177915A, CN109177916A and CN109159755A owned by the same applicant.

Some safety belt devices have a pretension device with a pretension function and are well-known in the prior art. The pretension device can pretension a safety belt to better restrain and protect a vehicle occupant in case of emergency of a vehicle. Pretension devices are also known in various forms in the prior art. For example, a pyrotechnic pretension device known in the prior art may comprise a ball gear and a steel ball shooting device, wherein upon ignition of a gas generator, steel balls are shot successively to impact the ball gear, and in turn the ball gear rotates a belt reel in a webbing winding direction. Some other pretension devices are also known in the art, which comprise a snakelike flexible strip and a gear, wherein the flexible strip may be pushed out for engagement with the gear, so as to rotate the belt reel in the webbing winding direction. Typically, a pretension device is arranged at a side of a frame, while a sensing unit and a locking mechanism are arranged at the other side of the frame. Such arrangement may need a large structural space.

In some cases, an activated pretension device may provide an excessive pretension force, and thus may over-restrain a vehicle occupant, wherein an excessive peak value of a shoulder webbing force may do harm to the vehicle occupant. For this purpose, a load limiting device may be provided in a safety belt device, which can limit the load-bearing capacity of a safety belt retractor and thus avoid the excessive peak value of the shoulder webbing force. Relevant prior art may be, for example, referred to the patent literature CN102227341B.

In the prior art, U-shaped frames are widely applied to safety belt retractors. However, in some cases, a U-shaped frame isn't suitable, since a whole safety belt retractor can't be easily assembled, or the safety belt retractor has a large overall size. In particular for a safety belt retractor with a pretension function and a load limiting function, both a frame of the safety belt retractor and the overall arrangement of components of the safety belt retractor may be further improved.

SUMMARY OF INVENTION

An object of the disclosure is to provide a safety belt retractor and a safety belt device comprising the same, wherein the belt retractor is simple in structure and friendly in assembly.

According to a first aspect of the invention, there is proposed a safety belt retractor comprising a frame and a belt reel, wherein the belt reel is rotatably supported in the frame and is configured for winding a webbing, wherein the frame comprises:
  a back plate having a first side and a second side opposite to each other and having a first opening;
  first support legs extending from the first side of the back plate;
  a first support plate having a second opening and connected to free end regions of the first support legs;
  second support legs extending from the second side of the back plate; and
  a second support plate connected to free end regions of the second support legs;
  wherein the first opening and the second opening are configured to receive the belt reel.

According to the technical solution of the invention, in the frame of the safety belt retractor, other components of the safety belt retractor may be easily assembled. The safety belt retractor is both simple in structure and friendly in assembly.

In some embodiments, the safety belt retractor may comprise a locking mechanism. Preferably, the locking mechanism may comprise a movable locking claw and a locking plate, wherein the locking plate is formed by the second support plate that has a third opening with an internal tooth system, wherein an engagement of the locking claw with the internal tooth system causes that the belt reel is locked in a webbing pull-out direction.

In some embodiments, the safety belt retractor may comprise a sensing unit configured to cooperate with the locking mechanism.

In some embodiments, the sensing unit may be arranged at a side of the second support plate facing away from the back plate.

In some embodiments, the sensing unit may be a sensing unit for sensing an acceleration and/or a tilt angle of a vehicle and/or a pull-out acceleration of the webbing.

In some embodiments, the safety belt retractor may comprise a stop wheel, which is rotation-fixedly connected with the belt reel at an axial end of the belt reel facing the back plate, and carries the movable locking claw of the locking mechanism, wherein the engagement of the locking claw with the internal tooth system causes that the stop wheel is locked in the webbing pull-out direction.

In some embodiments, the safety belt retractor may comprise a pretension device having a driving element and a driven element, wherein the driven element is arranged directly or indirectly rotation-fixedly with respect to the belt reel, wherein the pretension device, when activated, can directly or indirectly drive the belt reel in the webbing winding direction.

In some embodiments, the driven element may be rotation-fixedly arranged on the stop wheel between the back plate and the second support plate, wherein the pretension device, when activated, can drive the stop wheel in the webbing winding direction.

In some embodiments, the pretension device may comprise a steel ball shooting device as the driving element, and a ball gear as the driven element, wherein the steel ball shooting device, when activated, can shoot a plurality of steel balls that can drive the ball gear in the webbing winding direction.

In some embodiments, the safety belt retractor may comprise a load limiting device, which rotation-fixedly connects the belt reel with the stop wheel, and which can transmit a torque no more than a predetermined threshold value between the belt reel and the stop wheel.

In some embodiments, the load limiting device may be configured as a torsion bar, which is received in a chamber of the belt reel, and which can be plastically deformed when a predetermined torsion load is exceeded, and thus can limit the torque transmittable between the belt reel and the stop wheel through the torsion bar.

In some embodiments, the torsion bar may have a first end adjacent to the first opening and a second end adjacent to the second opening, wherein the torsion bar is rotation-fixedly connected to the stop wheel at its first end and is rotation-fixedly connected to the belt reel at its second end.

Alternatively, it is possible that the torsion bar may be replaced by a torsion spring with very high rigidity. In the case where the safety belt retractor is in normal operation and thus the load is tiny, the torsion of the torsion spring may be negligible.

In some other embodiments, the load limiting device may have a rigid structure, which may have a weak portion. When the load of the safety belt retractor reaches a predetermined threshold value, the weak portion is destroyed, for example it's broken or twisted off, and thus the load of the safety belt retractor can be limited.

In some embodiments, the stop wheel may be directly rotation-fixedly connected to the belt reel. In some other embodiments, the stop wheel may be indirectly rotation-fixedly connected with the belt reel via an intermediate component, for example, via the torsion bar as mentioned above.

In the specification, the term "rotation-fixed connection" means that two connected components are not rotatable or substantially not rotatable relative to each other. However, due to the presence of a clearance or a manufacturing error or the elasticity of the components of the whole connection system, the two connected components may slightly rotate relative to each other. For example, a connection between a gear and a shaft through a spline may be referred to as a "rotation-fixed connection". For example, a gear with a non-circular hole and a shaft with a complementary non-circular cross section can be rotation-fixedly connected to each other. On the contrary, if a gear is freely fitted on a shaft and thus is rotatable relative to the shaft, such a connection may be referred to as a "rotatable connection". It can be understood, when two components are welded or bonded to each other or integrally formed, they can rotate together, and thus they are rotation-fixedly connected.

In some embodiments, the first support legs and/or the second support legs may be integrally formed with the back plate. In some other embodiments, the support legs may also be configured as separate components connected with the back plate.

In some embodiments, the number of the first support legs may be 2, 3, 4, 5 or more.

In some embodiments, the number of the second support legs may be 2, 3, 4, 5 or more.

In some embodiments, the first support legs may each have a bent end region. Preferably, the bent end regions of the first support legs may have at least three fixing portions for fixing the first support plate in total.

In some embodiments, the connection between the first support legs and the first support plate and/or the connection between the second support legs and the second support plate may be achieved by bolting, riveting, bonding and/or welding.

In some embodiments, the end regions of the first support legs may be bent inward.

In some embodiments, the frame may have two first support legs opposite to each other. For example, the first support legs may each have two fixing portions. It is also possible that one of the first support legs may have two fixing portions, and the other first support leg may have exact one fixing portion. The two first support legs may be configured identically or differently.

In some embodiments, the two first support legs may be symmetrical with each other about a longitudinal axis of the safety belt retractor, wherein the first support legs may each have two fixing portions for fixing the first support plate.

In some embodiments, the second support legs may each have a bent end region, and the bent end regions of the second support legs may have at least three fixing portions for fixing the second support plate in total.

In some embodiments, the end regions of the second support legs may be bent inward.

In some embodiments, the frame may have four distributed second support legs, each of which may have one fixing portion for fixing the second support plate.

In some embodiments, the four second support legs may be spaced apart from each other at a uniform angular interval with respect to a longitudinal axis of the safety belt retractor.

It can be understood, it is not inevitably necessary that the support legs each have one fixing portion. For example, in the case of six second support legs, it is possible that only three of the second support legs each have one fixing portion, while the other three second support legs have no fixing portion.

In some embodiments, the first opening and the second opening may be configured as rotation bearings for the belt reel.

In some embodiments, the second opening may be configured as an axial stop for the belt reel.

In some embodiments, the second support plate may be configured as an axial stop for the belt reel or for the stop wheel.

According to some particularly advantageous embodiments, the safety belt retractor may comprise the frame, the belt reel, the sensing unit, the locking mechanism and the pretension device, wherein the sensing unit is configured to cooperate with the locking mechanism; and the locking mechanism has a locking plate formed by the second support plate, and for this purpose, the second support plate has a third opening with an internal tooth system. The safety belt retractor may comprise a stop wheel, which is rotation-fixedly connected with the belt reel at an axial end of the belt reel facing the back plate, and which carries a movable locking claw of the locking mechanism, wherein an engagement of the locking claw with the internal tooth system causes that the stop wheel is locked in a webbing pull-out direction. The sensing unit is arranged at a side of the second support plate facing away from the back plate. The pretension device comprises a driving element and a driven element that is rotation-fixedly arranged on the stop wheel between the back plate and the second support plate, and the pretension device, when activated, can drive the stop wheel in the webbing winding direction. In this technical solution, various components of the safety belt retractor, especially the belt reel, the pretension device, the locking mechanism and the sensing unit, can be easily assembled. With the sensing unit, the locking mechanism and the pretension device being arranged at the same side of the frame, the safety belt retractor is not only integrated with many functions, but also has a particularly compact size.

According to a second aspect of the invention, there is proposed a safety belt device comprising a webbing and the safety belt retractor according to the first aspect of the invention, wherein the webbing is wound on the belt reel of the safety belt retractor.

Finally, it should be pointed out that the technical features mentioned above, the technical features to be introduced below and the technical features shown in the drawings can be arbitrarily combined with each other, only if they are not contradictory. All the possible combinations of the technical features are technical contents contained in the disclosure.

BRIEF DESCRIPTION OF THE DRAWINGS

Now, the invention will be described in more detail with reference to the attached drawings. The schematic drawings are briefly described as below.

EMBODIMENTS

Figure 1:
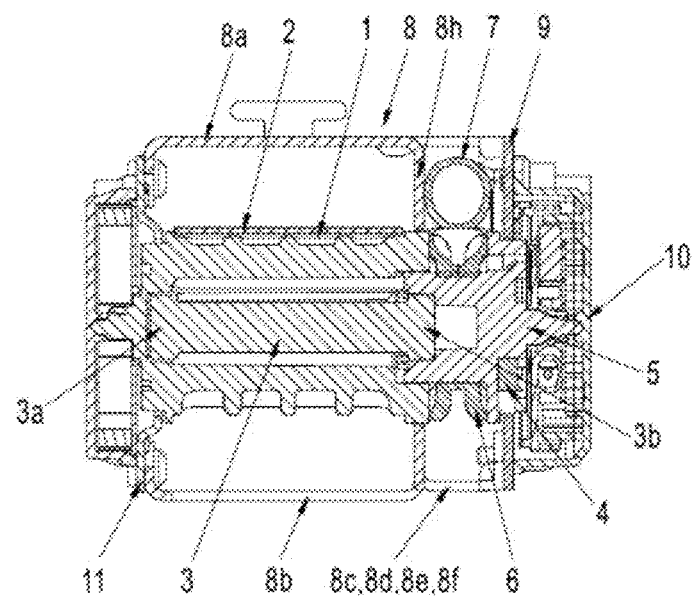
FIG. 1 is a longitudinal sectional view of a safety belt retractor according to an embodiment of the invention.

Now, an embodiment of a safety belt retractor according to the invention is described with reference to FIGS. 1 and 2. It can be understood, the invention is not limited to the specific embodiment shown in the drawings. The safety belt retractor together with a webbing 2 schematically shown in FIG. 1, as an overall system, may be referred to as a safety belt device.

The shown safety belt retractor comprises a belt reel 1 and a frame 8, in which the belt reel 1 is rotatably supported and is configured for winding the webbing 2. The safety belt retractor further comprises a sensing unit 10, a locking mechanism 4 and a pretension device 7, which are known in the prior art, as mentioned above. Here, the sensing unit 10, the locking mechanism 4, the pretension device 7 and a load limiting device 3 are all optional, and any one or more of these structural units may be spared according to the actual requirements. The sensing unit 10 may be a sensing unit for sensing an acceleration and/or a tilt angle of a vehicle and/or a pull-out acceleration of the webbing. The sensing unit 10 may also comprise a plurality of sub-units capable of sensing at least one of the just-mentioned parameters respectively. When the sensing unit 10 senses the emergency of the vehicle, for example, the vehicle is about to collide, the locking mechanism 4 may be activated by the sensing unit 10.

It is common in the prior art that the sensing unit and the locking mechanism are arranged at a side of the frame, while the pretension device is arranged at the other side of the frame. On the contrary, in this embodiment of the present invention, the sensing unit 10, the locking mechanism 4 and the pretension device 7 are all arranged at the same side of the frame 8. More specifically, the sensing unit 10 is arranged at the side of a second support plate 9 facing away from a back plate 8h, and at least a driven element such as a ball gear 6 of the pretension device 7 is arranged between the back plate 8h and the second support plate 9 which will be explained later.

Figure 2:
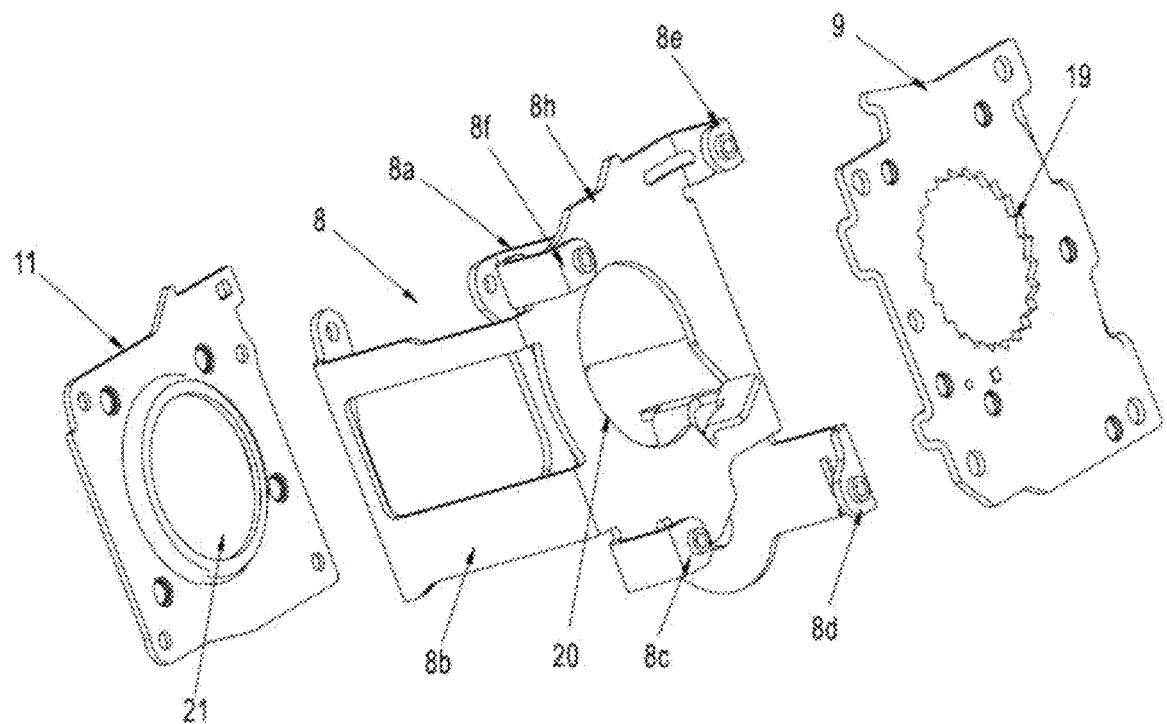
FIG. 2 is an exploded view of a portion of the safety belt retractor of FIG. 1.

As shown in FIG. 2, the frame 8 comprises: the back plate 8h having a first side and a second side opposite to each other and having a first opening 20; two first support legs 8a, 8b extending from the first side of the back plate and opposite to each other; a first support plate 11 having a second opening 21 and connected to free end regions of the first support legs; four second support legs 8c, 8d, 8e, 8f extending from the second side of the back plate; and the second support plate 9 connected to free end regions of the second support legs. The first opening 20 and the second opening 21 receive the belt reel 1. The first support legs 8a, 8b may be integrally formed with the back plate 8h. The second support legs 8c, 8d, 8e, 8f may also be integrally formed with the back plate 8h.

In FIG. 2, the two first support legs 8a, 8b are symmetrical with each other about a longitudinal axis of the safety belt retractor, and each have an end region bent inward, wherein the bent end region of each first support leg has two fixing portions for fixing the first support plate 11. The first support plate 11 may be connected to the first support legs, for example, by bolts.

As can be seen from FIG. 2, the frame 8 has four distributed second support legs 8c, 8d, 8e, 8f, each of which has an end region bent inward and has one fixing portion for fixing the second support plate 9 in the bent end region. The four second support legs 8c, 8d, 8e, 8f may be spaced apart from each other at a uniform angular interval with respect to the longitudinal axis of the safety belt retractor. The second support plate 9 may be connected to the free bent end regions of the second support legs 8c, 8d, 8e, 8f, for example, by bolts.

Here, the optional locking mechanism 4 is advantageously integrated in the safety belt retractor. The locking mechanism 4 may comprise a locking plate and a movable locking claw (not shown), wherein the locking plate is formed by the second support plate 9. For this purpose, the second support plate 9 may have a third opening 19, which may have an internal tooth system. The locking claw, when engaged with the internal tooth system, causes that the safety belt retractor is locked in the webbing pull-out direction.

The safety belt retractor may comprise a stop wheel 5, which is rotation-fixedly connected to the belt reel 1 at an axial end of the belt reel 1 facing the back plate 8h. The locking claw (not shown) of the locking mechanism 4 may be received in the stop wheel 5, more specifically, may be received in a recess (not shown) of the stop wheel 5.

The pretension device 7 may comprise a ball gear 6 rotation-fixedly fitted on the stop wheel 5, and a steel ball shooting device. The steel ball shooting device, when activated, may shoot a plurality of steel balls to drive the ball gear 6 in the webbing winding direction, wherein the ball gear can drive the stop wheel 5 and in turn drive the belt reel 1 to rotate in the webbing winding direction. As a result, a pretension function of the safety belt retractor can be realized on requirements.

In the sense of the invention, it is not inevitably necessary that the entire pretension device 7 is completely positioned in a space between the back plate 8h and the second support plate 9. It can be understood that at least a portion of the entire pretension device 7 is positioned in the space between the back plate 8*h* and the second support plate 9. In particular, the driven element such as the ball gear 6 of the pretension device 7, which is rotation-fixedly connected with the stop wheel 5, may be completely positioned in the space between the back plate 8*h* and the second support plate 9. In particular, the driving element of the pretension device 7, such as a snakelike element of the steel ball shooting device, may be only partially positioned in the space between the back plate and the second support plate, or even may be positioned completely outside this space.

It's particularly advantageous, the optional load limiting device 3 is integrated in the safety belt retractor. The load limiting device 3 rotation-fixedly connects the belt reel 1 with the stop wheel 5, and can transmit a torque no more than a predetermined threshold value between the belt reel 1 and the stop wheel 5. As shown in FIG. 1, the load limiting device 3 may be configured as a torsion bar, which is received in a chamber of the belt reel 1, and which is plastically deformable when a predetermined torsion load is exceeded, in order to limit the torque transmittable between the belt reel 1 and the stop wheel 5 through the torsion bar. The torsion bar has a first end 3*b* adjacent to the first opening 20 and a second end 3*a* adjacent to the second opening 21, and is rotation-fixedly connected to the stop wheel 5 at its first end 3*b* and is rotation-fixedly connected to the belt reel 1 at its second end 3*a*.

If the optional load limiting device 3 as shown in FIG. 1 is spared, the belt reel 1 and the stop wheel 5, as two separate components, may also be replaced with one integral belt reel, wherein a portion of the integral belt reel may have the function of the stop wheel 5.

It is also possible that the pretension device 7 and the sensing unit 10 as shown in FIG. 1 exchange their positions. If the optional pretension device 7 shown in FIG. 1 is spared, the optional sensing unit 10 may also be arranged between the back plate 8*h* and the second support plate 9.

The safety belt retractor as shown in FIGS. 1 and 2 may operate as below:

When an emergency occurs to a vehicle equipped with the safety belt retractor as described above, for example, in case of an imminent collision or rollover of the vehicle, the sensing unit 10 may sense the emergency of the vehicle, and cause the locking claw of the locking mechanism 4 to move away from its rest position until the locking claw engages with the internal tooth system of the second support plate 9. The engagement of the locking claw with the internal tooth system causes that the stop wheel 5 is stopped in the webbing pull-out direction, and thus the belt reel 1 is locked in the webbing pull-out direction. In this way, the belt reel 1 and the stop wheel 5 can only rotate in the webbing winding direction, and can't rotate in the webbing pull-out direction.

In addition, the pretension device 7 is activated, for example, a gas generator of a pyrotechnic pretension device is ignited, wherein the generated gas shoots the plurality of steel balls contained in a snakelike tube. The steel balls successively drive the ball gear 6 in the webbing winding direction, and thus the ball gear 6 drives the stop wheel 5 and in turn drives the belt reel 1 to rotate in the webbing winding direction. The steel ball shooting device may comprise a winding snakelike tube, which is provided with a gas generator at its one end and accommodates the plurality of steel balls, and which aims at the ball gear 6 at its other end. The steel balls shot out of the snakelike tube may impact the teeth of the ball gear and mesh into ball sockets between the teeth of the ball gear. In FIG. 1, only a circular cross section of the snakelike tube is schematically shown.

If the torque to be transmitted between the stop wheel 5 and the belt reel 1 through the load limiting device 3 that is configured as a torsion bar exceeds a predetermined threshold value, the torsion bar can be plastically deformed, thereby limiting the maximal load of the safety belt retractor and thus limiting the peak value of the shoulder webbing force of the webbing 2, and hence preventing the vehicle occupant from being injured due to the excessive peak value of the shoulder webbing force.

It's particularly advantageous, the first opening 20 and the second opening 21 may be configured as rotation bearings for the belt reel 1. It's also advantageous, the second opening 21 may be configured as an axial stop for the belt reel 1. Moreover, it's advantageous, the locking plate 9 may be configured as an axial stop for the stop wheel 5. It's appropriate, the two axial ends of the safety belt retractor may be additionally provided with a respective end cover for covering some components of the safety belt retractor.

Finally, it should be pointed out, the above-mentioned specific embodiments are only for understanding the invention, and don't limit the protection scope of the invention. For those skilled in the art, modifications can be made on the basis of the specific embodiments, and such amendments don't depart from the protection scope of the invention.

The invention claimed is:

1. A safety belt retractor comprising a frame and a belt reel, wherein the belt reel is rotatably supported in the frame and is configured for winding a webbing, wherein the frame comprises:
   a back plate having a first side and a second side opposite to each other and having a first opening;
   first support legs extending from the first side of the back plate and integrally formed with the back plate;
   a first support plate, as a first component separate from the back plate, having a second opening and connected to free end regions of the first support legs;
   second support legs extending from the second side of the back plate and integrally formed with the back plate; and
   a second support plate, as a second component separate from the back plate, connected to free end regions of the second support legs;
   wherein the first opening and the second opening are configured to receive the belt reel.

2. The safety belt retractor as recited in claim 1, wherein the safety belt retractor comprises a locking mechanism having a movable locking claw and a locking plate, wherein the locking plate is formed by the second support plate, wherein the second support plate has a third opening with an internal tooth system, wherein the locking claw, when engaged with the internal tooth system, causes the belt reel to be locked in a webbing pull-out direction.

3. The safety belt retractor as recited in claim 2, wherein the safety belt retractor comprises a sensing unit configured to cooperate with the locking mechanism, wherein the sensing unit is arranged at a side of the second support plate facing away from the back plate.

4. The safety belt retractor as recited in claim 2, wherein the safety belt retractor comprises a stop wheel, which is rotation-fixedly connected with the belt reel at an axial end of the belt reel facing the back plate and carries the movable locking claw of the locking mechanism, wherein the locking claw, when engaged with the internal tooth system, causes the stop wheel to be locked in the webbing pull-out direction.

5. The safety belt retractor as recited in claim 4, wherein the safety belt retractor comprises a pretension device having a driving element and a driven element, wherein the driven element is rotation-fixedly arranged on the stop wheel and between the back plate and the second support plate, wherein the pretension device, when activated, can drive the stop wheel in the webbing winding direction.

6. The safety belt retractor as recited in claim 4, wherein the safety belt retractor comprises a load limiting device, which rotation-fixedly connects the belt reel with the stop wheel, wherein the load limiting device can transmit a torque no more than a predetermined threshold value between the belt reel and the stop wheel.

7. The safety belt retractor as recited in claim 6, wherein the load limiting device is configured as a torsion bar, which is received in a chamber of the belt reel, and is plastically deformable when a predetermined torsion load is exceeded, in order to limit the torque transmittable between the belt reel and the stop wheel through the torsion bar;

wherein the torsion bar has a first end adjacent to the first opening and a second end adjacent to the second opening, and is rotation-fixedly connected to the stop wheel at its first end, and is rotation-fixedly connected to the belt reel at its second end.

8. The safety belt retractor as recited in claim 1, wherein the safety belt retractor comprises a pretension device having a driving element and a driven element, wherein the driven element is configured to be directly or indirectly rotation-fixed with respect to the belt reel, wherein the pretension device, when activated, can directly or indirectly drive the belt reel in the webbing winding direction.

9. The safety belt retractor as recited in claim 1, wherein the first support legs each have a bent end region, wherein the bent end regions of the first support legs have at least three fixing portions for fixing the first support plate in total.

10. The safety belt retractor as recited in claim 9, wherein the end regions of the first support legs are bent inward toward a belt reel axis.

11. The safety belt retractor as recited in claim 1, wherein the frame has two first support legs opposite to each other;

wherein the two first support legs are symmetrical with each other about a longitudinal axis of the safety belt retractor, wherein the first support legs each have two fixing portions for fixing the first support plate.

12. The safety belt retractor as recited in claim 1, wherein the second support legs each have a bent end region, wherein the bent end regions of the second support legs have at least three fixing portions for fixing the second support plate in total.

13. The safety belt retractor as recited in claim 12, wherein the end regions of the second support legs are each bent inward toward a belt reel axis.

14. The safety belt retractor as recited in claim 12, wherein the second support plate is configured as an axial stop for the stop wheel.

15. The safety belt retractor as recited in claim 1, wherein the frame has four distributed second support legs, each of which has one fixing portion for fixing the second support plate;

wherein the four second support legs are spaced apart from each other at a uniform angular interval with respect to a longitudinal axis of the safety belt retractor.

16. The safety belt retractor as recited in claim 1, wherein the first opening and the second opening are configured as rotation bearings for the belt reel.

17. The safety belt retractor as recited in claim 1, wherein the second opening is configured as an axial stop for the belt reel.

18. A safety belt device having a webbing, wherein the safety belt device further comprises the safety belt retractor as recited in claim 1, wherein the webbing is wound on the belt reel of the safety belt retractor.

* * * * *